(12) United States Patent
Ikeuchi et al.

(10) Patent No.: US 8,737,848 B2
(45) Date of Patent: May 27, 2014

(54) OPTICAL RECEIVER

(75) Inventors: Tadashi Ikeuchi, Kawasaki (JP); Naoki Kuwata, Kawasaki (JP)

(73) Assignees: Fujitsu Limited, Kawasaki (JP); Fujitsu Optical Components Limited, Kawasaki (JP)

( * ) Notice: Subject to any disclaimer, the term of this patent is extended or adjusted under 35 U.S.C. 154(b) by 547 days.

(21) Appl. No.: 13/011,328

(22) Filed: Jan. 21, 2011

(65) Prior Publication Data

US 2011/0182591 A1 Jul. 28, 2011

(30) Foreign Application Priority Data

Jan. 25, 2010 (JP) ................................. 2010-013606
Aug. 30, 2010 (JP) ................................. 2010-192165

(51) Int. Cl.
*H04B 10/06* (2011.01)

(52) U.S. Cl.
USPC ............. 398/208; 398/38; 398/209; 398/210; 398/213

(58) Field of Classification Search
None
See application file for complete search history.

(56) References Cited

U.S. PATENT DOCUMENTS

| 5,920,414 A * | 7/1999 | Miyachi et al. ............... 398/14 |
| 6,381,064 B1 * | 4/2002 | Terahara ................ 359/337.13 |
| 6,941,079 B1 * | 9/2005 | Barozzi et al. ................ 398/157 |
| 7,362,498 B1 * | 4/2008 | Li et al. .................... 359/341.41 |
| 2002/0041432 A1 | 4/2002 | Onaka et al. |
| 2009/0129785 A1 | 5/2009 | Murakami |
| 2010/0142958 A1 | 6/2010 | Matsumoto |

FOREIGN PATENT DOCUMENTS

| JP | 2000-252923 | 9/2000 |
| JP | 2005-142291 | 6/2005 |
| JP | 2007-306164 | 11/2007 |
| JP | 2008-166719 | 7/2008 |
| JP | 2009-124655 | 6/2009 |
| JP | 2010-136195 | 6/2010 |

OTHER PUBLICATIONS

Japanese Office Action mailed Jan. 7, 2014 in corresponding Japanese Application No. 2010-192165.

* cited by examiner

*Primary Examiner* — Li Liu

(74) *Attorney, Agent, or Firm* — Staas & Halsey LLP

(57) ABSTRACT

An optical receiver includes: an optical amplifier amplifying an optical signal fed thereinto according to an operating current fed thereinto, the optical signal being a wavelength-multiplexed optical signal, a demultiplexer demultiplexing an optical signal output from the optical amplifier; and an operating-current control circuit selecting a monitoring target from a plurality of wavelength signals output from the demultiplexer and controlling the operating current of the optical amplifier so that optical power of the monitoring target is controlled to be a predetermined value.

10 Claims, 17 Drawing Sheets

— ·· — ·  OPERATING CURRENT100mA
— — — —  OPERATING CURRENT150mA
————    OPERATING CURRENT200mA
·········   OPERATING CURRENT250mA

OPTICAL RECEIVER

CROSS-REFERENCE TO RELATED APPLICATION

This application is based upon and claims the benefit of priority of the prior Japanese Patent Application No. 2010-013606, filed on Jan. 25, 2010 and Japanese Patent Application No. 2010-192165, filed on Aug. 30, 2010, the entire contents of which are incorporated herein by reference.

FIELD

A certain aspect of embodiments described herein relates to an optical receiver.

BACKGROUND

WDM (Wavelength Division Multiplex) transmission using a plurality of channels is used in a high speed optical communication system in order to enlarge transmission capacity, as operation speed of each component gets closer to a limit. Application of the WDM transmission to a transmission having a relatively short distance of a few tens km or less is under review, although the WDM transmission is applied only to a transmission having a distance of a few hundreds km or more. In the system, an optical amplifier is not provided on a transmission path, for cost reduction. For example, a transmitter modulates a plurality of signals having a different wavelength, multiplexes the modulated signals and transmits the multiplexed signal without amplifying. A receiver amplifies the multiplexed signal at a semiconductor optical amplifier in block in order to establish the distance extension, branches the amplified signal and receives the branched signals at light-receiving elements.

It is preferable that the light-receiving element of the receiver has a large dynamic range in order to use an optical fiber having variation of distance. For example, it is preferable that the light-receiving element has the dynamic range of 20 dB or more with respect to distance variation of 0 km to a few tens km of an optical fiber. There is a case where optical intensity is different from each other between the channels.

Japanese Patent Application Publication No. 2008-166719 (hereinafter referred to as Document 1) discloses an art in which input power and output power are monitored with respect to a specific wavelength, and a gain is controlled according to a table storing characteristics of a semiconductor optical amplifier. Japanese Patent Application Publication No. 2000-252923 (hereinafter referred to as Document 2) discloses an art in which wavelength dependency of the optical intensity (optical power) is corrected with a gain equalizer or the like.

However, the art of Document 1 fails to secure a large dynamic input range with respect to a plurality of channels because the art of Document 1 monitors a single wavelength. With the art of Document 2, cost for components may be increased.

SUMMARY

According to an aspect of the present invention, there is provided an optical receiver including: an optical amplifier amplifying an optical signal fed thereinto according to an operating current fed thereinto, the optical signal being a wavelength-multiplexed optical signal, a demultiplexer demultiplexing an optical signal output from the optical amplifier; and an operating-current control circuit selecting a monitoring target from a plurality of wavelength signals output from the demultiplexer and controlling the operating current of the optical amplifier so that optical power of the monitoring target is controlled to be a predetermined value.

According to an aspect of the present invention, there is provided a light-receiving method including: amplifying an optical signal fed into an optical amplifier according to an operating current of the optical amplifier, the optical signal being a wavelength-multiplexed optical signal; demultiplexing an output optical signal of the optical amplifier; selecting a monitoring target from a plurality of wavelength signals branched in the demultiplexing; and controlling the operating current of the optical amplifier so that optical power of the monitoring target is kept constant.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1A:
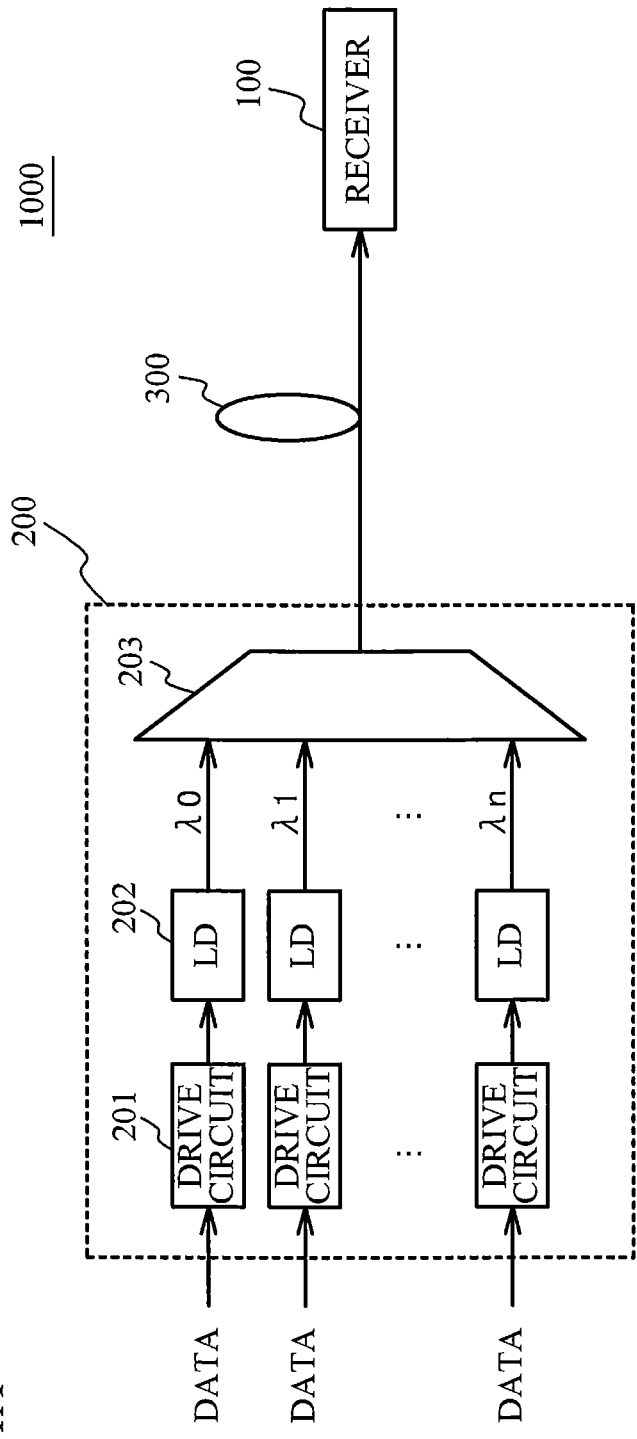
FIG. 1A to FIG. 1C illustrate an optical transmission system to which an optical receiver in accordance with a first embodiment is applied.

FIG. 1A illustrates a block diagram of an optical transmission system 1000 to which an optical receiver 100 in accordance with a first embodiment is applied. As illustrated in FIG. 1A, the optical transmission system 1000 has a structure in which the optical receiver 100 is coupled to an optical transmitter 200 via an optical transmission path 300.

The optical transmitter 200 has a drive circuit 201 and a laser diode 202 with respect to each wavelength signal of a plurality of channels. And the optical transmitter 200 has a multiplexer 203 for multiplexing the wavelength signals. Each of the drive circuits 201 generates a drive signal based on a data fed thereinto. The laser diode 202 outputs a wavelength signal based on the drive signal fed thereinto from the drive circuit 201. In FIG. 1A, each of the wavelength signals is indicated as "$\lambda_0$" to "$\lambda_n$". The "n" is an integer of 2 or more, and is the number of the channels. Here, the laser diode 202 may be a laser having a modulator using external modulation method, such as an external modulation type of electroabsorption optical modulator.

The multiplexer 203 multiplexes the wavelength signals "$\lambda_0$" to "$\lambda_n$" fed thereinto from laser diodes 202, and outputs the multiplexed signal to the optical transmission path 300 as a wavelength-multiplexed optical signal. The optical receiver 100 receives the optical signal having transmitted the optical transmission path 300. An optical amplifier of the optical receiver 100 amplifies the optical signal. After 3 that, the optical receiver 100 branches the optical signal and receives the branched optical signals.

Figure 1C:
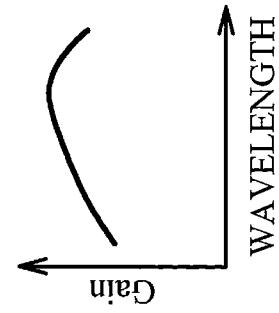
Figure 1B:
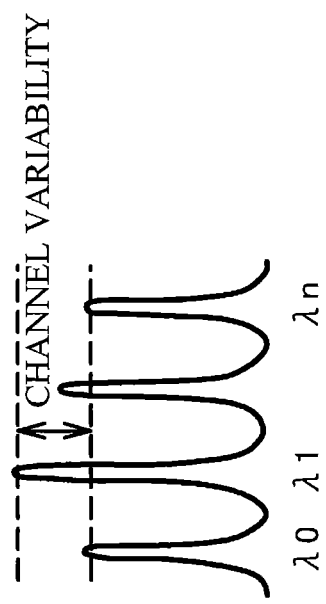

FIG. 1B illustrates a schematic view of optical power of the wavelength signals "$\lambda_0$" to "$\lambda_n$" of each channel. As illustrated in FIG. 1B, the optical power of each wavelength signal has a variation. In other words, at least two of the optical power of the wavelength signals may be different from each other. Thus, the optical power of the wavelength signals branched in the optical receiver 100 has a variation. In other words, at least two of the optical power of the wavelength signals through demultiplexing may be different from each other.

FIG. 1C illustrates a schematic view of a wavelength dependency of a gain of the semiconductor optical amplifier of the optical receiver 100. In FIG. 1C, a horizontal axis indicates a wavelength, and a vertical axis indicates a gain. As illustrated in FIG. 1C, the gain of the semiconductor optical amplifier fluctuates according to the wavelength. Thus, the optical signals fed into each light-receiving element of the optical receiver 100 may have a variation in optical power. And so, the optical receiver in accordance with the embodiment has a simple structure and secures a large dynamic input range with respect to a plurality of channels.

Figure 2A:
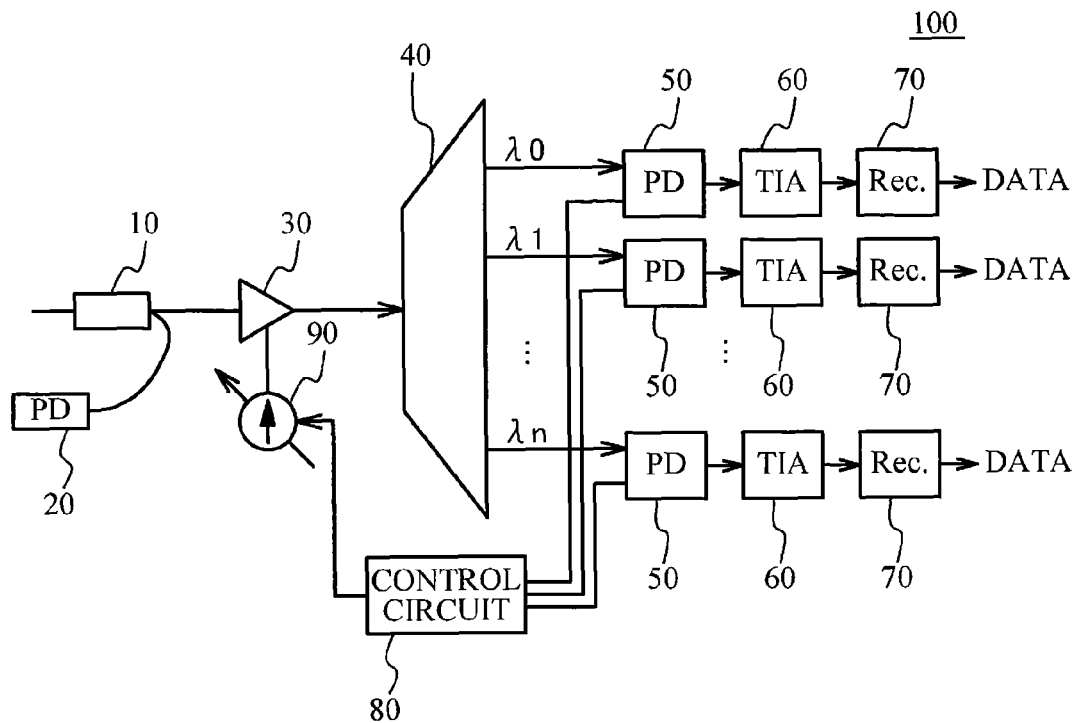
FIG. 2A illustrates a block diagram of the optical receiver in accordance with the first embodiment.

FIG. 2A illustrates a block diagram of the optical receiver 100 in accordance with the embodiment. As illustrated in FIG. 2A, the optical receiver 100 has an optical coupler 10, a light-receiving element 20, a semiconductor optical amplifier 30, a demultiplexer 40, a plurality of light-receiving elements 50, a plurality of TIAs (Trans Impedance Amplifier) 60, a plurality of light-receiving circuits 70, an operating-current control circuit 80, and an operating-current provide circuit 90.

The optical coupler 10 branches an optical signal fed into the optical receiver 100 into two optical signals. The light-receiving element 20 receives one of the branched optical signals. The light-receiving element 20 converts the optical signal fed into the optical receiver 100 into an electrical signal and inputs the converted optical signal into the operating-current control circuit 80. Thus, the operating-current control circuit 80 detects optical power of the optical signal fed into the optical receiver 100. The semiconductor optical amplifier 30 receives the other of the branched optical signals. The semiconductor optical amplifier 30 amplifies an optical signal with an operating current provided from the operating-current provide circuit 90 and outputs the amplified optical signal. The demultiplexer 40 branches the amplified optical signal output from the semiconductor optical amplifier 30 into wavelength signals "$\lambda_0$" to "$\lambda_n$" of each channel, and inputs the wavelength signals into each light-receiving element 50 separately.

The light-receiving element 50 converts the optical power of the wavelength signal fed thereinto into a current signal, and inputs the converted current signal into the TIA 60 and the operating-current control circuit 80. Thus, the operating-current control circuit 80 detects the optical power of each wavelength signal. The TIA 60 converts the current signal fed thereinto with a method of impedance conversion, amplifies the converted current signal, and outputs the amplified current signal as a voltage signal. The light-receiving circuit 70 converts the voltage signal fed thereinto from the TIA 60 into a data, and outputs the data. The light-receiving circuit 70 is structured with a limiter amplifier and so on. The operating-current control circuit 80 controls the operating current provided to the semiconductor optical amplifier 30 from the operating-current provide circuit 90 according to the optical power detected by the light-receiving element 20 and each light-receiving element 50.

Figure 2B:
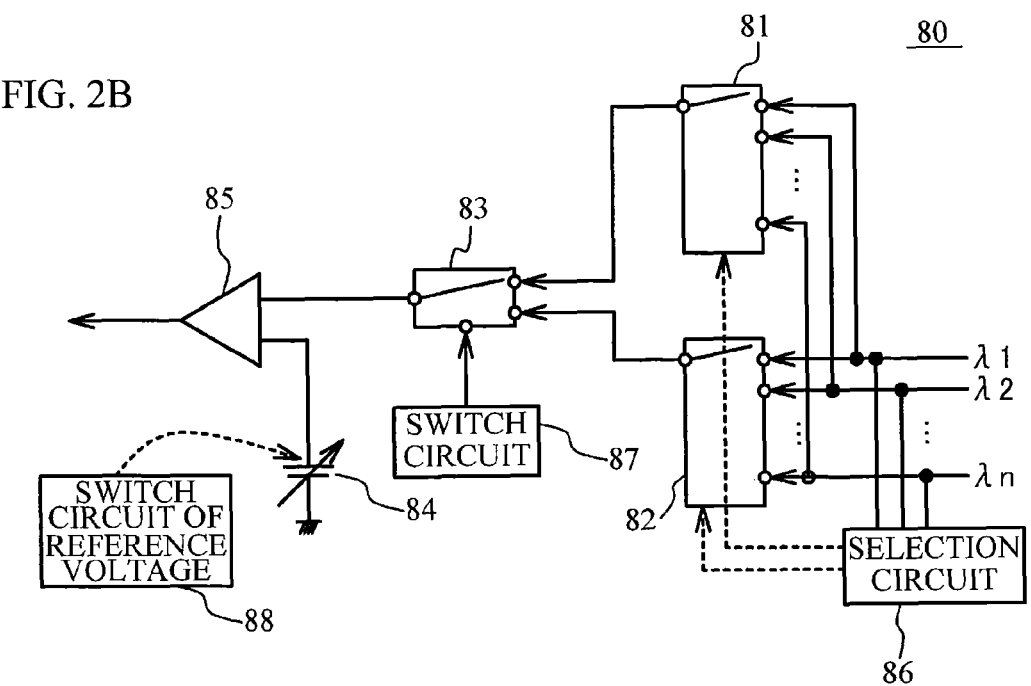
FIG. 2B illustrates a block diagram of details of an operating-current control circuit.

FIG. 2B illustrates a block diagram of the operating-current control circuit 80. As illustrated in FIG. 2B, the operating-current control circuit 80 has a first switch 81, a second switch 82, a third switch 83, a reference-voltage generation circuit 84, an amplifier 85, a channel selection circuit 86, a switch circuit 87 and a reference-voltage switch circuit 88. The first switch 81, the second switch 82 and the third switch 83 are an analog switch.

The first switch 81, the second switch 82 and the channel selection circuit 86 receive output currents of the light-receiving elements 50. The channel selection circuit 86 detects optical power of a wavelength signal detected by each light-receiving element 50 based on the current signal fed thereinto. In the embodiment, the channel selection circuit 86 controls the first switch 81 and the second switch 82 so that a wavelength signal having given optical power is selected. The switch circuit 87 controls the third switch 83 according to the detection result of the light-receiving element 20 so that one of the output signals of the first switch 81 and the second switch 82 is output. The reference voltage generation circuit 84 inputs a reference voltage set by the reference voltage switch circuit 88 into the amplifier 85. Thus, the optical power fed into the light-receiving element 50 of a channel selected by the third switch 83 is feed-back controlled to be a given control value based on the reference voltage.

Figure 3:
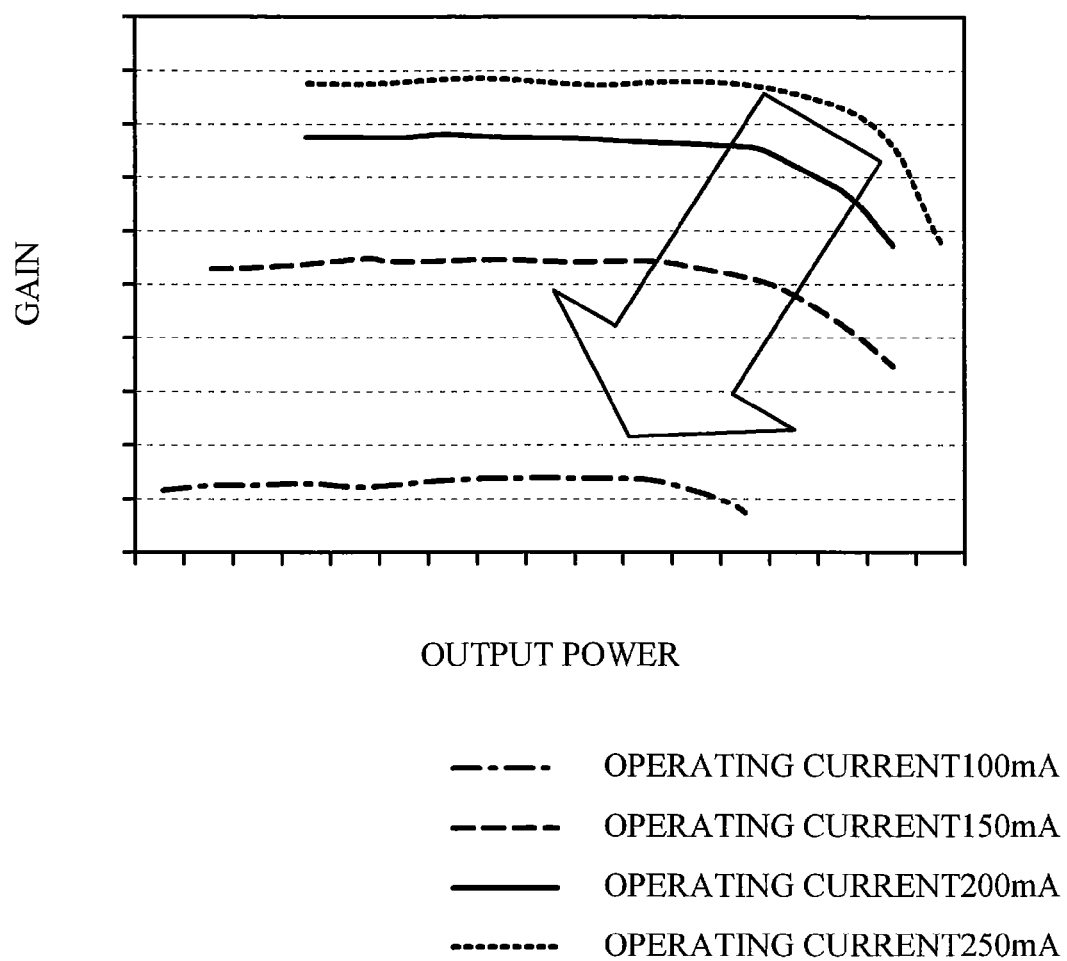
FIG. 3 illustrates a relationship between an operating current, a gain and output power of a semiconductor optical amplifier.

Here, a description will be given of the characteristics of the semiconductor optical amplifier 30. FIG. 3 illustrates a relationship between the operating-current, the gain, and the output power of the semiconductor optical amplifier 30. In FIG. 3, a horizontal axis indicates the output power of the semiconductor optical amplifier 30, and a vertical axis indicates the gain of the semiconductor optical amplifier 30. As illustrated in FIG. 3, the gain of the semiconductor optical amplifier 30 is kept approximately constant even if the output power fluctuates, if the operating current is constant. The gain of the semiconductor optical amplifier 30 gets smaller as the operating current gets smaller.

Next, a description will be given of an error free area of the semiconductor optical amplifier 30. The error free area is determined based on the PD-TIA input power, the ASE power of the semiconductor optical amplifier 30, input power which the light-receiving element can receive, and so on. The PD-TIA power is optical power fed into the light-receiving element 50 coupled to the TIA 60.

Figure 4A:
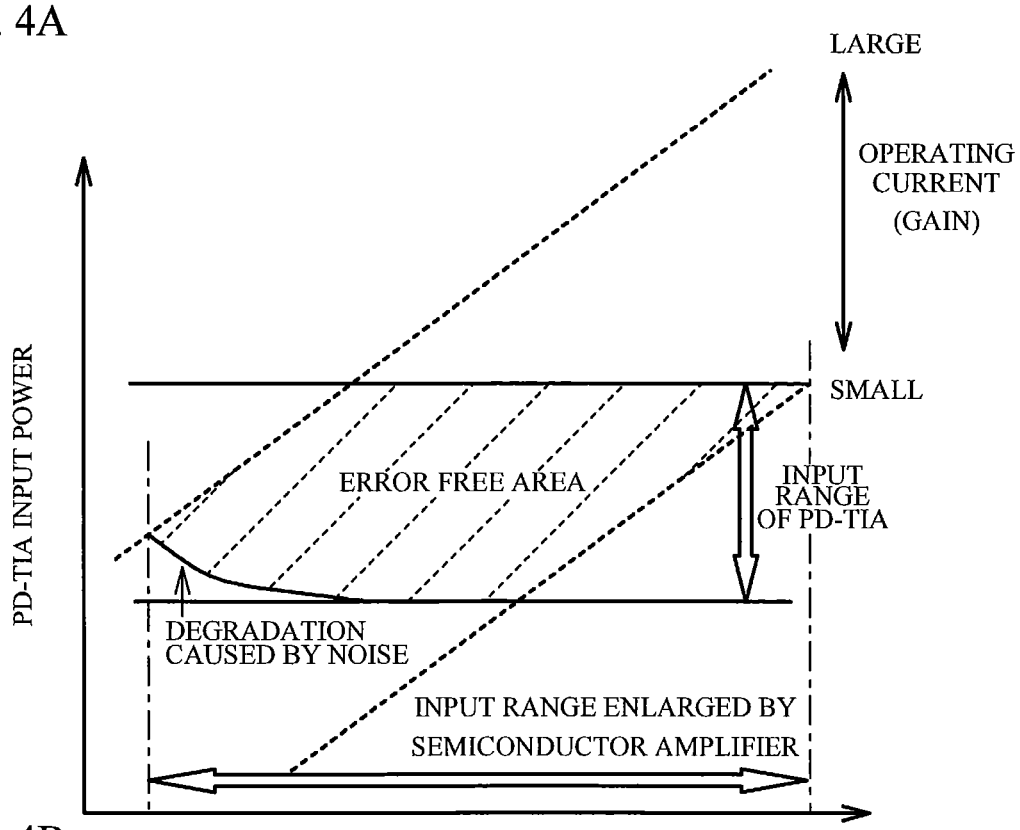
FIG. 4A and FIG. 4B illustrate an error free area of the semiconductor optical amplifier.
Figure 4B:
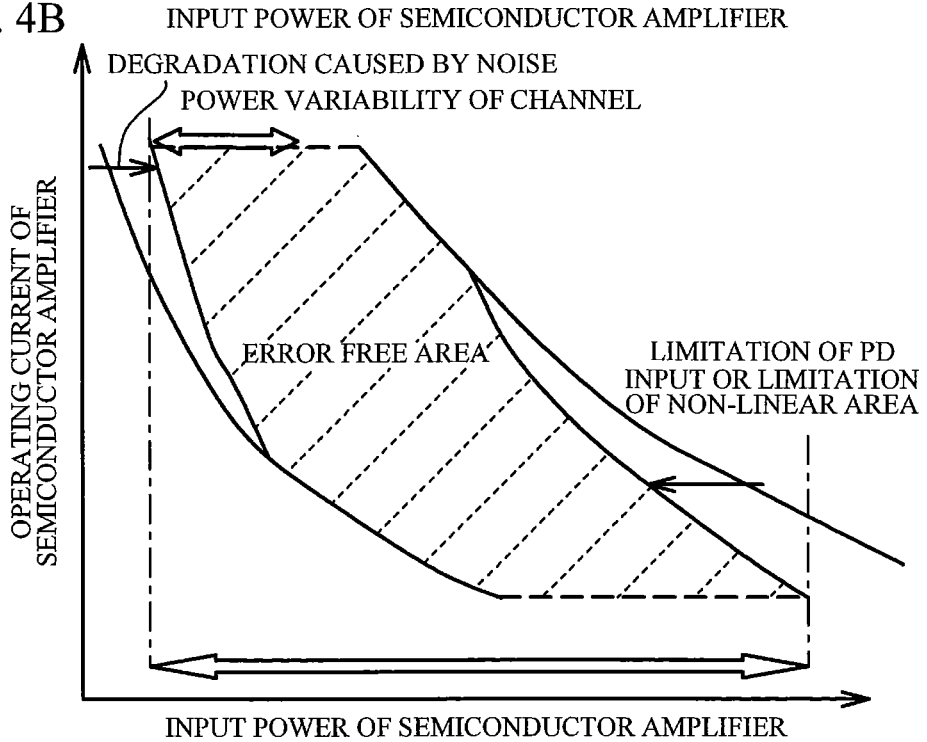

FIG. 4A and FIG. 4B illustrate the error free area of the semiconductor optical amplifier 30. In FIG. 4A, a horizontal axis indicates the power fed into the semiconductor optical amplifier 30, and a vertical axis indicates the PD-TIA input power. In FIG. 4B, a horizontal axis indicates the power fed into the semiconductor optical amplifier 30, and a vertical axis indicates the operating current of the semiconductor optical amplifier 30.

As illustrated in FIG. 4A, the light-receiving element 50 has a lower limit of light-receiving sensitivity. Therefore, the error free area has a lower limit. The light-receiving element 50 has an allowed current amount. Therefore, the error free area has an upper limit. The lower limit of the error free area gets higher in an area where the power fed into the semiconductor optical amplifier 30 is small, because a ratio of the ASE increases when the power fed into the semiconductor optical amplifier 30 is small. The upper limit of the error free area is not affected, because the ratio of the ASE decreases when the power fed into the semiconductor optical amplifier 30 is large.

The error free area is determined with the gain of the semiconductor optical amplifier 30. As illustrated in FIG. 3, the gain hardly fluctuates even if the output power of the semiconductor optical amplifier 30 changes. Therefore, there is a proportional relationship between the power fed into the semiconductor optical amplifier 30 and the PD-TIA input power, when the gain is kept constant. On the other hand, the gain of the semiconductor optical amplifier 30 has a lower limit and an upper limit. Therefore, the upper limit and the lower limit of the PD-TIA input power in the error free area are determined according to the proportional relationship. And, the upper limit and the lower limit of the optical power fed into the semiconductor optical amplifier 30 are determined according to the proportional relationship. Thus, the error free area of the semiconductor optical amplifier 30 is illustrated with oblique lines of FIG. 4A.

FIG. 4B illustrates the error free area with the relationship between the power fed into the semiconductor optical amplifier 30 and the operating current of the semiconductor optical amplifier 30. In FIG. 4B, an input limit of the light-receiving element 50 and a non-linear area are considered. The non-linear area is a wave distortion that appears when a large optical power is fed into the semiconductor optical amplifier 30. Here, the variation of the power of each channel is considered. The variation of the power of each channel is a variation of the optical power fed into the semiconductor optical amplifier 30 of each channel. The variation mainly appears in the optical transmitter 200. Therefore, the variation of the channel is a given range in the horizontal direction of FIG. 4B.

As illustrated in FIG. 4A and FIG. 4B, the error free area is a finite area. In the embodiment, the operating current of the semiconductor optical amplifier 30 is controlled so that the wavelength signal of each channel is included in the error free area illustrated in FIG. 4A and FIG. 4B, even if the variation of channels appears.

For example, the gain of the semiconductor optical amplifier 30 is controlled to be higher and the power fed into the light-receiving element 50 is increased, when the power fed into the semiconductor optical amplifier 30 is small. The gain fails to increase when the operating current exceeds a given value. Therefore, the minimum of the power fed into each light-receiving element 50 is feed-back controlled. In this case, a channel having the other large power is included in the error free area if the channel having the minimum power is selected for monitoring target.

On the other hand, the maximum of the power fed into each light-receiving element 50 is feed-back controlled if the power fed into the semiconductor optical amplifier 30 is large. In this case, a channel having the other small power is included in the error free area if the channel having the maximum power is selected for the monitoring target.

Figure 5:
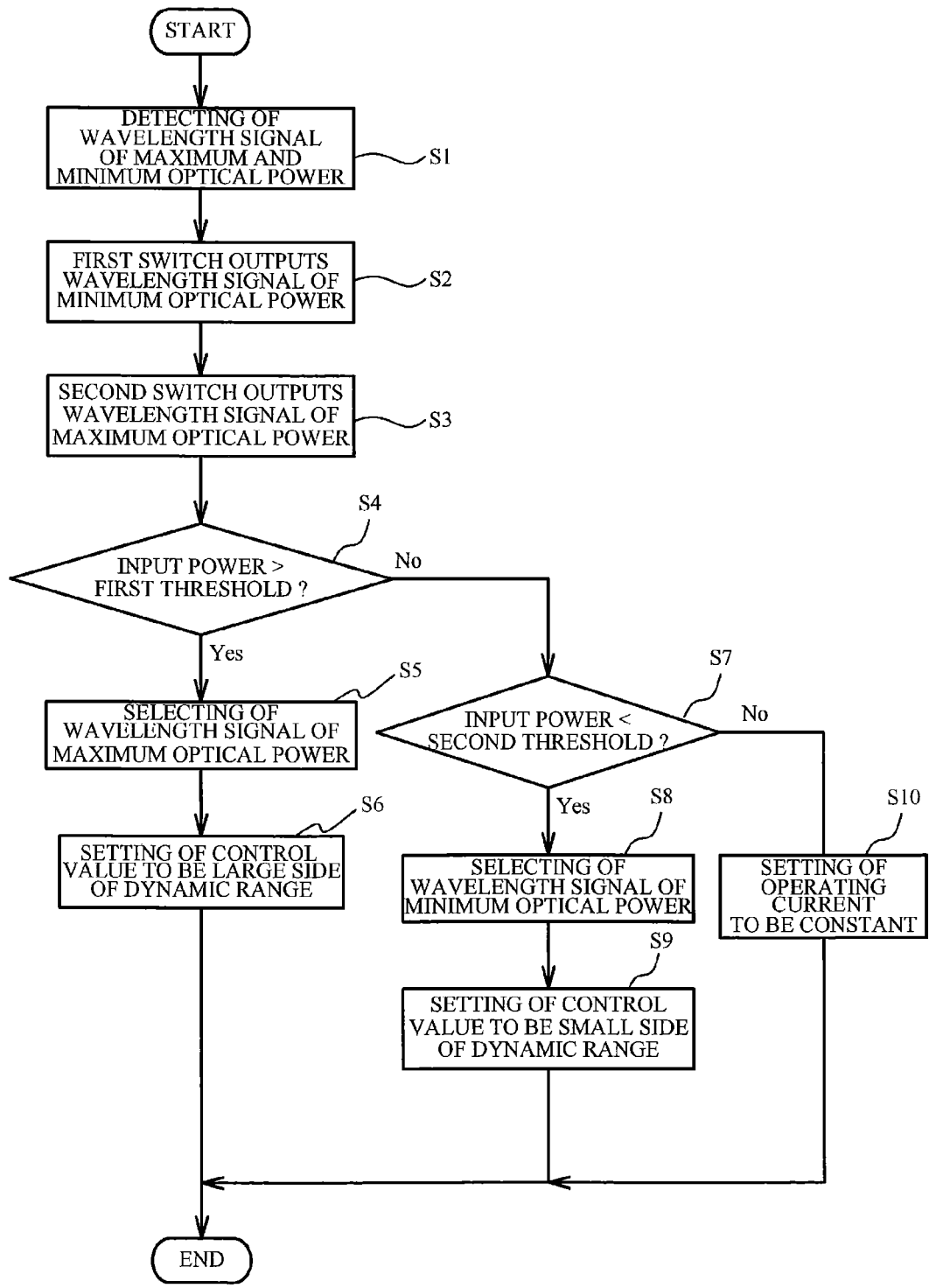
FIG. 5 illustrates an example of a flowchart.

Next, a description will be given of a concrete control with reference to FIG. 5. FIG. 5 illustrates an example of a flowchart. As illustrated in FIG. 5, the channel selection circuit 86 detects the wavelength signal having the minimum optical power and the wavelength signal having the maximum optical power from the light-receiving elements 50 (Step S1). The channel selection circuit 86 controls the first switch 81 so that the detected wavelength signal having the minimum optical power is selected (Step S2). Thus, the first switch 81 selects and outputs the wavelength signal having the minimum optical power. On the other hand, the channel selection circuit 86 controls the second switch 82 so that the wavelength signal having the maximum optical power is selected (Step S3). Thus, the second switch 82 selects and outputs the wavelength signal having the maximum optical power.

The switch circuit 87 receives the output current of the light-receiving element 20. Thus, the switch circuit 87 detects the optical power fed into the semiconductor optical amplifier 30. The switch circuit 87 determines whether the optical power fed into the semiconductor optical amplifier 30 exceeds a first threshold (a first predetermined value) (Step S4). If it is determined "yes" in Step S4, the switch circuit 87 controls the third switch 83 so that the wavelength signal having the maximum optical power is output (Step S5). Thus, the wavelength signal having the maximum optical power becomes a monitoring target for the feed-back control. Next, the reference voltage switch circuit 88 sets the feed-back control value of the semiconductor optical amplifier 30 to be a large side value of the dynamic range of the light-receiving element 50 (a value that is equal to a second predetermined value or more) (Step S6). The value of the large side is from an average value to the maximum value in the dynamic range of the PD-TIA input. After that, the flowchart is finished.

If it is determined "No" in Step S4, the switch circuit 87 determines whether the optical power fed into the semiconductor optical amplifier 30 is less than the second threshold (Step S7). The second threshold is an optical value that is equal to the first threshold or less. If it is determined "Yes" in Step S7, the switch circuit 87 controls the third switch 83 so that the wavelength signal having the minimum optical power is output (Step S8). Thus, the wavelength signal having the minimum optical power becomes the monitoring target for the feed-back control. Next, the reference voltage switch circuit 88 sets the feed-back control value of the semiconductor optical amplifier 30 to be a small side value of the dynamic range of the light-receiving element 50 (a value that is equal to a third predetermined value or less) (Step S9). The value of the small side is from the minimum value to the average value in the dynamic range of the PD-TIA input. After that, the flowchart is finished. If it is determined "No" in Step S7, the operating current of the semiconductor optical amplifier 30 is set to be a predetermined value (Step S10). After that, the flowchart is finished. In addition, if it is determined "No" in Step S7, the feedback control value may be set to be an intermediate value of the dynamic range. The intermediate value is around the average value of the dynamic range of the PD-TIA input. The second threshold may not be provided, and if the input power is equal to the first threshold value or less, Step S8 may be executed without the execution of Step S7.

Figure 6A:
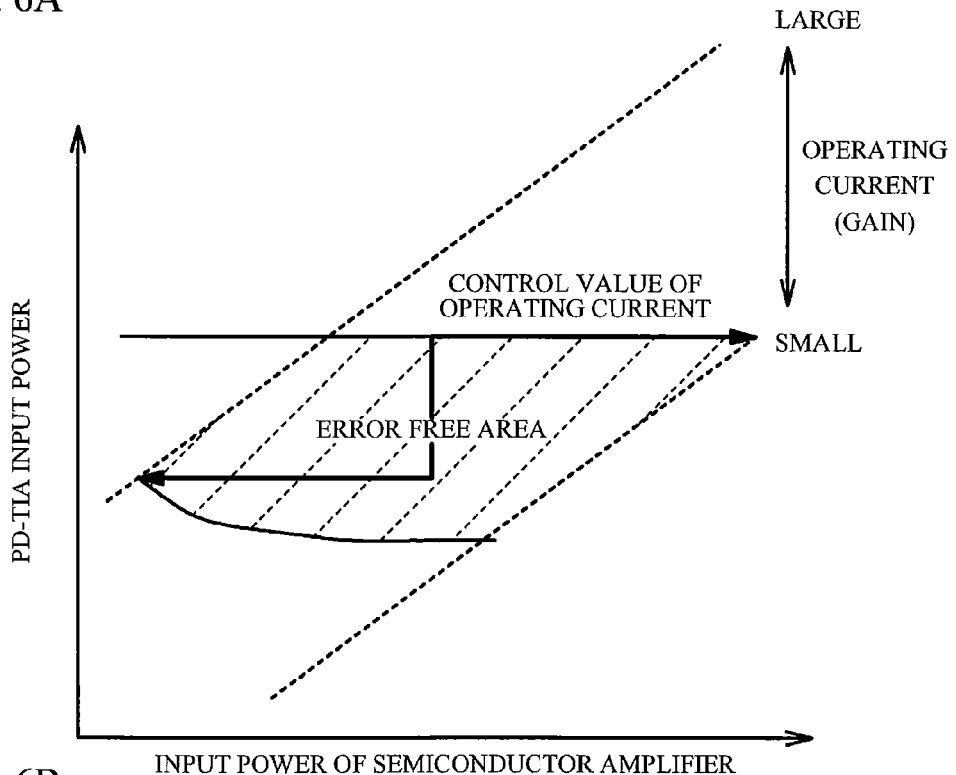
FIG. 6A and FIG. 6B illustrate a control in accordance with the flowchart of FIG. 5.
Figure 6B:
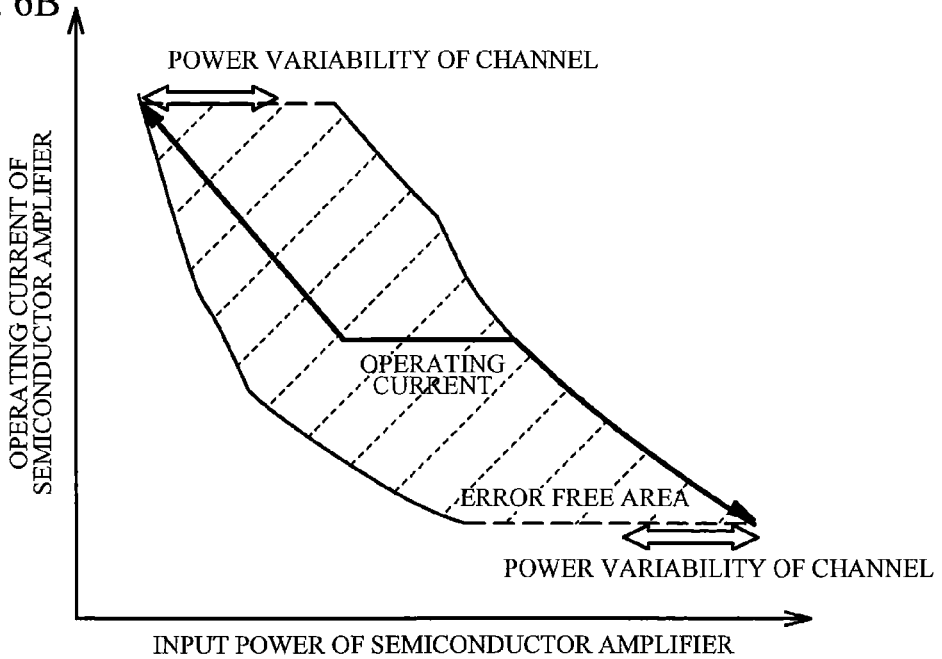

A description will be given of the control of the flowchart, with reference to FIG. 6A and FIG. 6B. When the optical power fed into the semiconductor optical amplifier 30 is small, the wavelength signal having the minimum optical power is selected as the monitoring target of the feed-back control, and the optical power fed into the light-receiving element 50 is set to be the small side value of the dynamic range. Therefore, the variation of the channels is included in the error free area. When the optical power fed into the semiconductor optical amplifier 30 is large, the wavelength signal having the maximum optical power is selected as the monitoring target of the feed-back control, and the optical power fed into the light-receiving element 50 is set to be the large side value of the dynamic range. Therefore, the variation of the channels is included in the error free area.

Thus, the operating current of the semiconductor optical amplifier 30 is adjusted adequately and a large dynamic input range is secured with respect to a plurality of the channels, even if there is optical power variation between the channels. And, the cost may be restrained, because the optical receiver 100 has a simple structure.

If the optical power of the monitoring target is changed, the light-receiving circuit 70 may change a recognition point that is used when the received signal is recognized and a date is generated. In concrete, the light-receiving circuit 70 may shift the recognition point to be the small side, when the optical power of the monitoring target is large. In this case, influence of a noise is restrained. Thus, recognition accuracy is improved.

In the embodiment, the wavelength signals outputting the maximum optical power and the minimum optical power are described. But, the structure is not limited to the above-embodiment. For example, the wavelength signal outputting optical power having an average or more of the optical power fed into each light-receiving element 50 may be used instead of the wavelength signal outputting the maximum optical power. In concrete, when the optical intensity fed into the semiconductor optical amplifier 30 is large, the wavelength outputting the optical power larger than the average of the optical power fed into each light-receiving element 50 may be selected as the monitoring target of the feed-back control. On the other hand, the wavelength signal outputting the optical power smaller than the average of the optical power fed into each light-receiving element 50 may be used instead of the wavelength outputting the minimum optical power. In concrete, when the optical intensity fed into the semiconductor optical amplifier 30 is small, the wavelength signal outputting the optical power smaller than the average of the optical power fed into each light-receiving element 50 may be selected as the monitoring target of the feed-back control.

Figure 7:
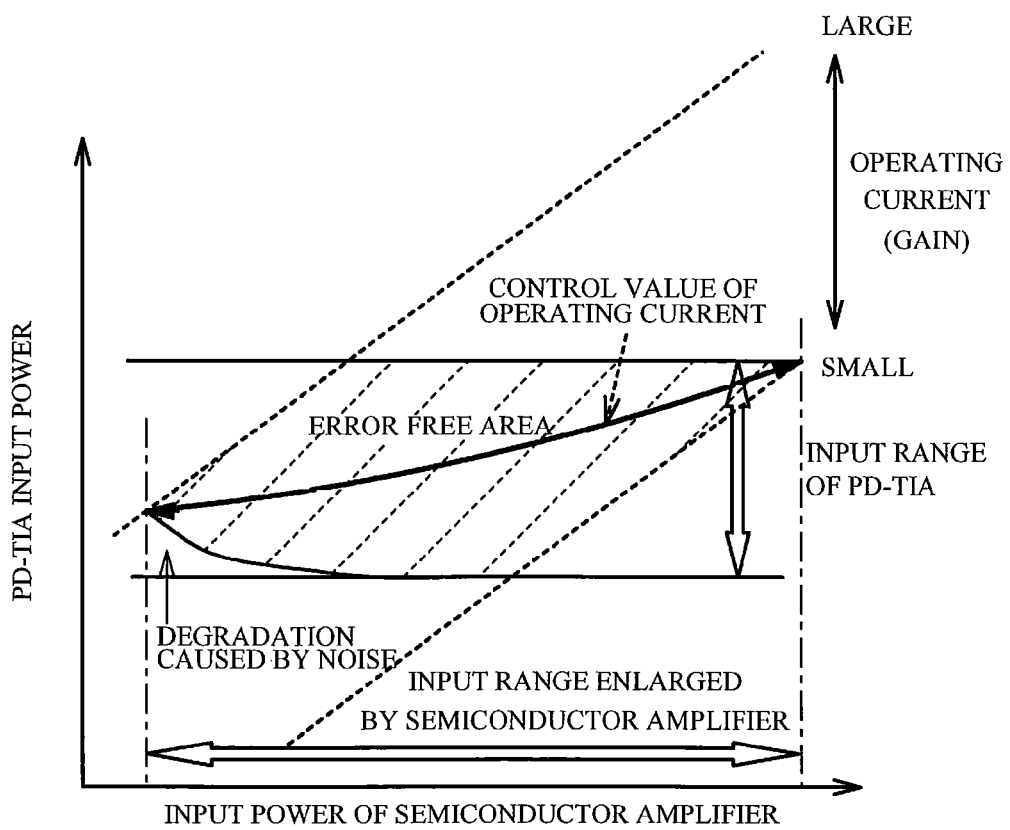
FIG. 7 illustrates a control in a case where an average of optical power is used as a feed-back control value of the semiconductor optical amplifier.

The average of the optical power fed into each light-receiving element 50 may be used as the feed-back control value of the semiconductor optical amplifier 30. A description will be given of the operating-current control value in this case, with reference to FIG. 7. The operating-current control value is set with use of a reference voltage of the semiconductor optical amplifier 30 in order to keep the optical power fed into the light-receiving element 50 constant. Thus, the operating-current control value monotonically increases or monotonically decreases according to the optical power fed into the semiconductor optical amplifier 30. With the control, the variation of the channels is included in the error free area.

In the embodiment, the semiconductor optical amplifier 30 is used as an optical amplifier. However, the structure is not limited to the above embodiment. For example, other optical amplifiers such as an optical fiber amplifier may be used.

In the embodiment, the optical power fed into the semiconductor optical amplifier 30 is directly detected with use of the light-receiving element 20. However, the structure is not limited to the above embodiment. For example, the optical power Pin(SOA) fed into the semiconductor optical amplifier 30 may be calculated with an operating current "Iop" of the semiconductor optical amplifier 30 and optical power "Pout" output from the semiconductor optical amplifier 30.

Figure 8:
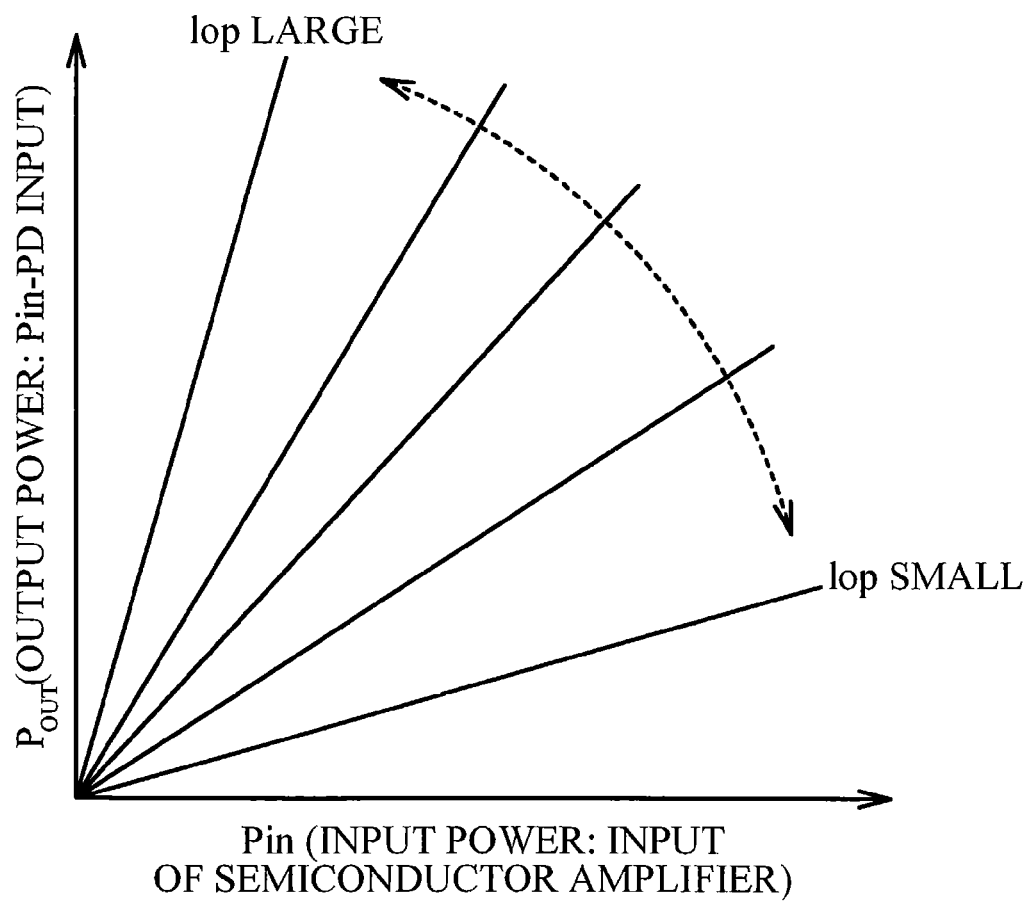
FIG. 8 illustrates a relationship between the operating current of the semiconductor optical amplifier, the output power of the semiconductor optical amplifier, and optical power fed into the semiconductor optical amplifier.

FIG. 8 illustrates a relationship between the operating current "Iop" of the semiconductor optical amplifier 30, the output optical power "Pout" from the semiconductor optical amplifier 30, and the optical power Pin(SOA) fed into the semiconductor optical amplifier 30. In FIG. 8, a horizontal axis indicates the optical power Pin(SOA) fed into the semiconductor optical amplifier 30, and a vertical axis indicates the output optical power "Pout" of the semiconductor optical amplifier 30. As illustrated in FIG. 8, the larger the operating current of the semiconductor optical amplifier 30 is, the larger a slope of the output optical power "Pout" with respect to the input optical power Pin(SOA) is. The smaller the operating current of the semiconductor optical amplifier 30 is, the smaller the slope of the output optical power "Pout" with respect to the input optical power Pin(SOA) is. This is because the gain changes according to the operating current. With the relationship, the optical power fed into the semiconductor optical amplifier 30 may be calculated based on the operating current of the semiconductor optical amplifier 30 and the optical power detected by the light-receiving element 50.

Figure 9:
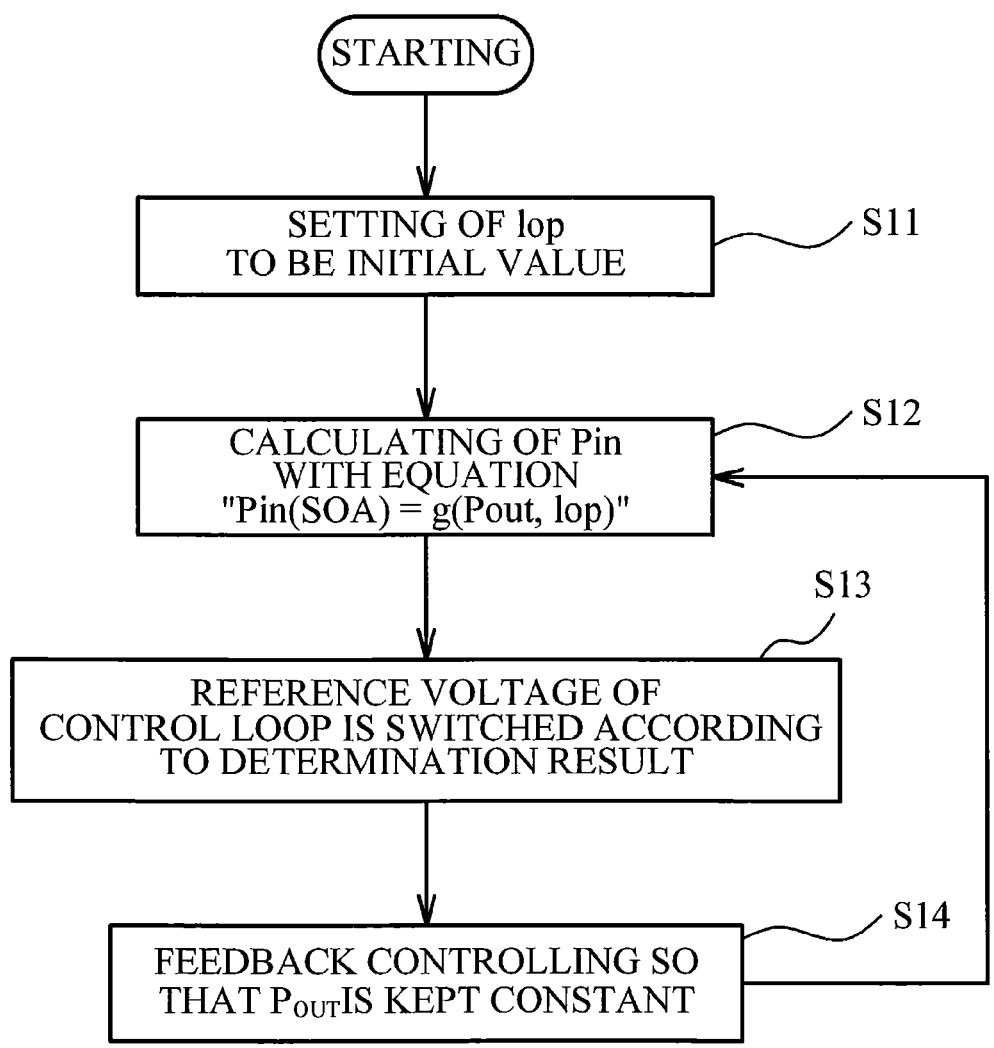
FIG. 9 illustrates an example of a flowchart in a case where the optical power fed into the semiconductor optical amplifier is calculated.

FIG. 9 illustrates an example of a flowchart in a case where the optical power fed into the semiconductor optical amplifier 30 is calculated. As illustrated in FIG. 9, the operating-current control circuit 80 sets the operating current "Iop" of the semiconductor optical amplifier 30 to be an initial value (Step S11). Next, the operating-current control circuit 80 calculates the Pin(SOA) with use of an equation "Pin(SOA)=g(Pout, Iop)" (Step S12). In this case, the relationship of FIG. 8 is used. Next, the operating-current control circuit 80 executes Step S4 through Step S9 of the flowchart of FIG. 5 (Step S13). Next, the operating-current control circuit 80 feed-back controls the output optical power "Pout" of the semiconductor optical amplifier 30 constant (Step S14). After that, the operating-current control circuit 80 executes Step S12 again after a given time period.

Figure 10:
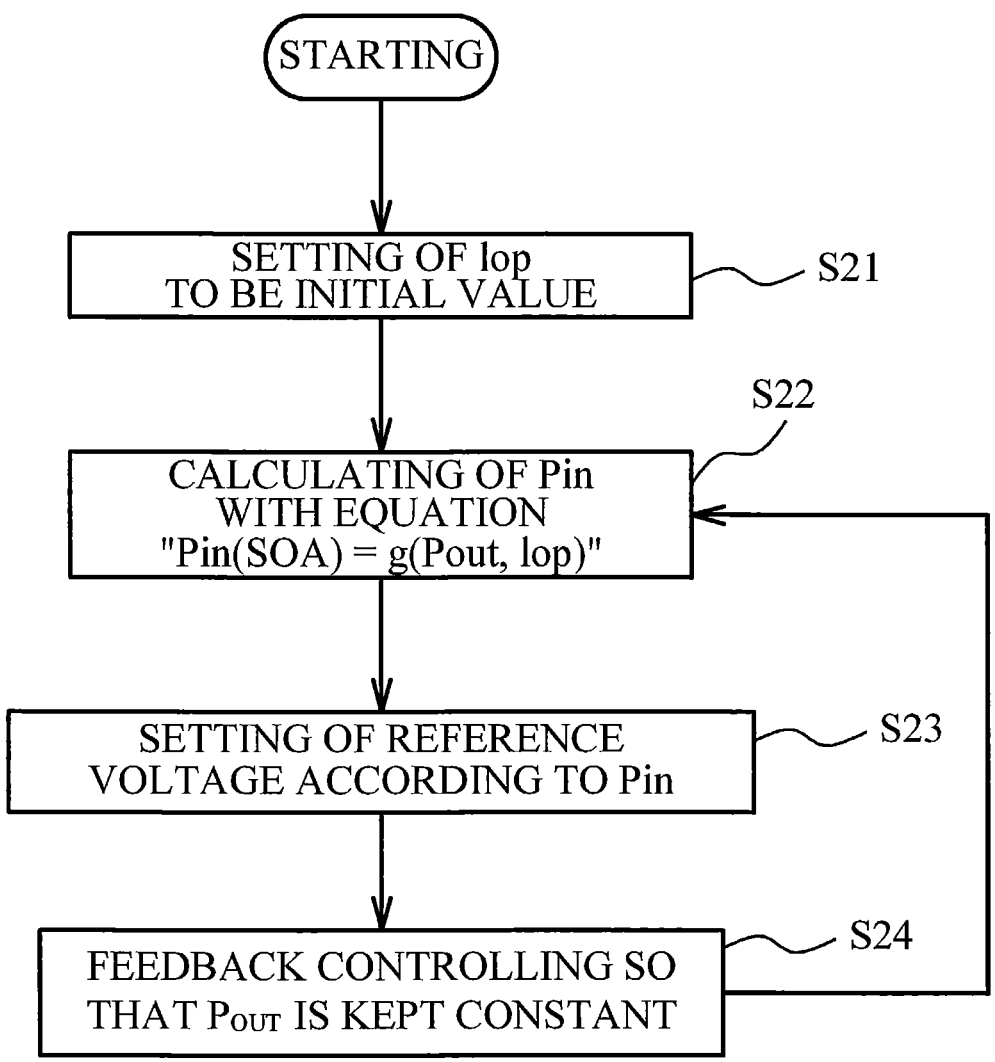
FIG. 10 illustrates another example of a flowchart in the case where the optical power fed into the semiconductor optical amplifier is calculated.

FIG. 10 illustrates another example of a flowchart in a case where the optical power fed into the semiconductor optical amplifier 30 is calculated. As illustrated in FIG. 10, the operating-current control circuit 80 sets the operating current "Iop" of the semiconductor optical amplifier 30 to be the initial value (Step S21). Next, the operating-current control circuit 80 calculates the Pin(SOA) with the equation "Pin(SOA)=g(Pout, Iop)" (Step S22). In this case, the relationship of FIG. 8 is used. Next, the operating-current control circuit 80 sets the average of the optical power fed into each light-receiving element 50 to be the feed-back control value of the semiconductor optical amplifier 30, and sets the reference voltage (Step S23). Next, the operating-current control circuit 80 feed-back controls the output power "Pout" of the semiconductor optical amplifier 30 constant (Step S24). After that, the operating-current control circuit 80 executes Step S22 again after a given time period.

In accordance with the flowcharts of FIG. 9 and FIG. 10, the optical power fed into the semiconductor optical amplifier 30 is calculated, and the operating current of the semiconductor optical amplifier 30 is controlled with the optical power fed into the semiconductor optical amplifier 30.

Second Embodiment

Figure 11:
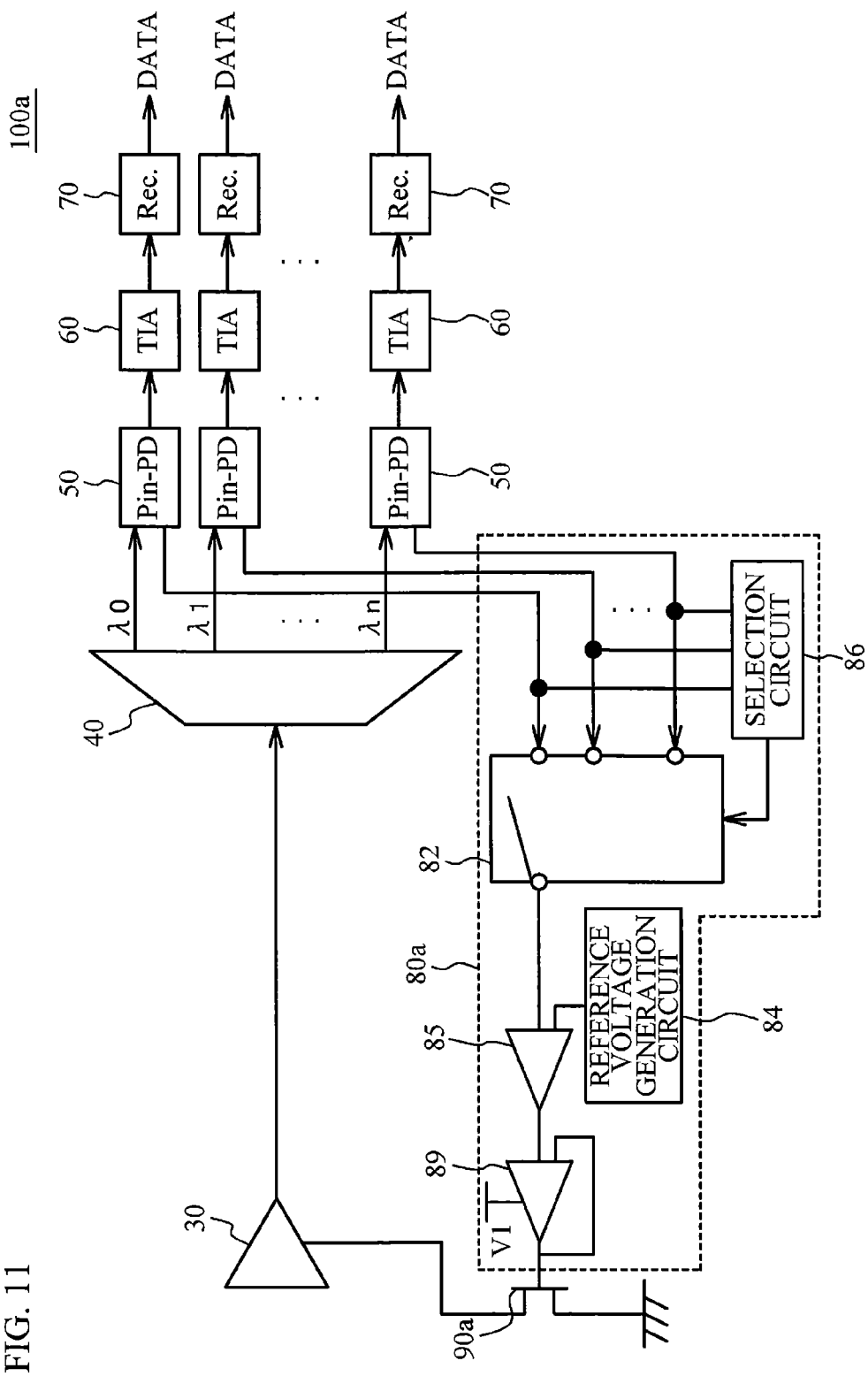
FIG. 11 illustrates a block diagram of an optical receiver in accordance with a second embodiment.

FIG. 11 illustrates a block diagram of an optical receiver 100a in accordance with a second embodiment. As illustrated in FIG. 11, the optical receiver 100a is different from the optical receiver 100 of FIG. 2 in a point that the optical coupler 10 and the light-receiving element 20 are not provided. The optical receiver 100a has an operating-current control circuit 80a and a variable-current provide circuit 90a instead of the operating-current control circuit 80 and the operating-current provide circuit 90. The operating-current control circuit 80a does not have the first switch 81 or the third switch 83, being different from the operating-current control circuit 80. The operating-current control circuit 80a has a limit amplifier 89. The limit amplifier 89 is an amplifier having a limit function limiting a current so as not to exceed a predetermined value (a maximum limit). Thus, the limit amplifier 89 acts as a maximum limit function circuit. The same components have the same reference numerals of FIG. 2 in order to avoid a duplicated explanation.

The error free area is a finite area as illustrated in FIG. 4A and FIG. 4B. In the embodiment, the operating current of the semiconductor optical amplifier 30 is controlled so that the wavelength signal of each channel is included in the error free area illustrated in FIG. 4A and FIG. 4B.

The channel selection circuit 86 controls the second switch 82 so that the detected wavelength signal having the maximum optical power is selected. Thus, the second switch 82 selects ant outputs the wavelength signal having the maximum optical power. As a result, the wavelength signal having the maximum optical power becomes the monitoring target of the feed-back control. The reference voltage generation circuit 84 inputs a reference voltage into the amplifier 85. Therefore, the optical power fed into the light-receiving element 50 of the channel selected by the second switch 82 is feed-back controlled to be a predetermined value based on the reference voltage. The reference voltage switch circuit 88 sets the feed-back control value of the semiconductor optical amplifier 30 so that the optical power fed into the light-receiving element 50 is smaller one of the value equal to or more than a predetermined value in the dynamic range of the light-receiving element 50 and an allowed value of the operating current. The predetermined value in this case is a value of a case where the wavelength signal having the minimum optical power is included in the error free area. The optical variation from the minimum optical power to the maximum optical power may be detected in advance. The allowed value of the operating current is an allowed current amount of the light-receiving element 50.

Figure 12A:
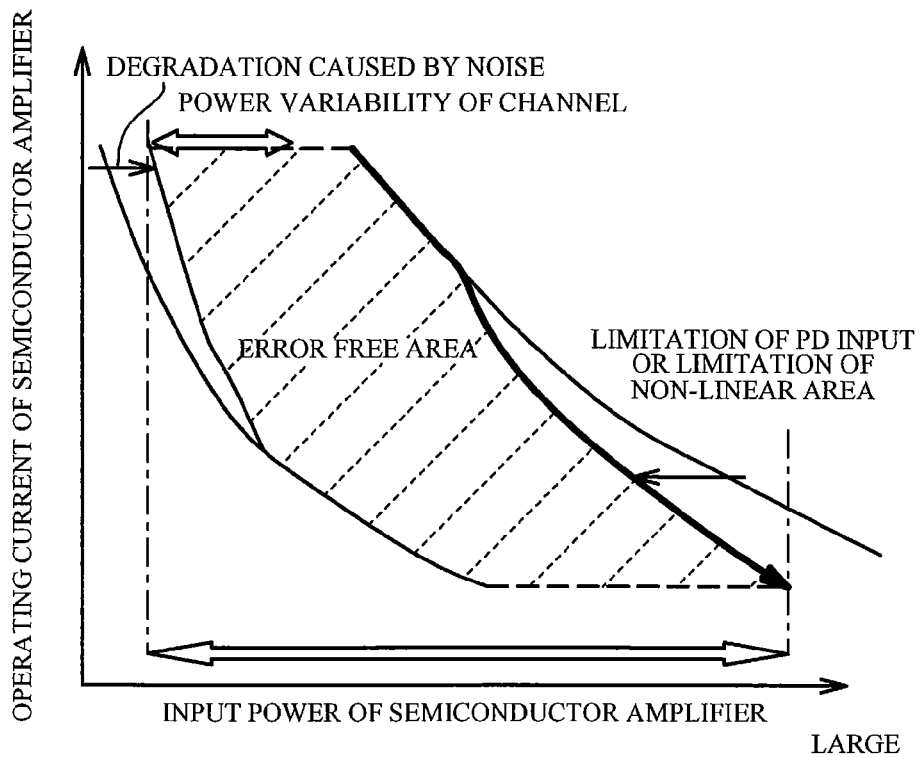
FIG. 12A and FIG. 12B illustrate a control in accordance with the second embodiment.
Figure 12B:
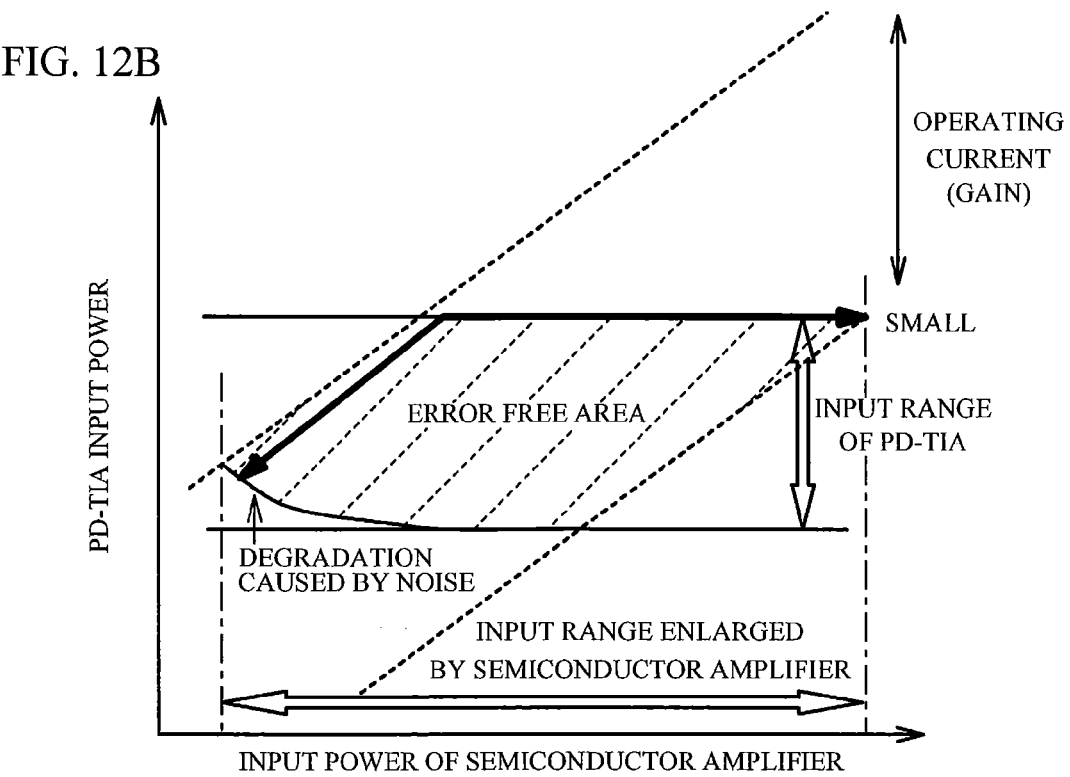

A limit current of the limit amplifier 89 is set so that the optical power fed into the light-receiving element 50 is smaller one of the predetermined value or more in the dynamic range of the light-receiving element 50 and the allowed value of the operating current. Therefore, the optical power of the wavelength signal having the maximum optical power is controlled to be the upper limit or less in the error free area. In this case, as illustrated with a thick solid line in FIG. 12A and FIG. 12B, the variations of the channels is included in the error free area. An amount affected on the error free area caused by the degradation of the noise of FIG. 12B may be obtained in advance.

Figure 13:
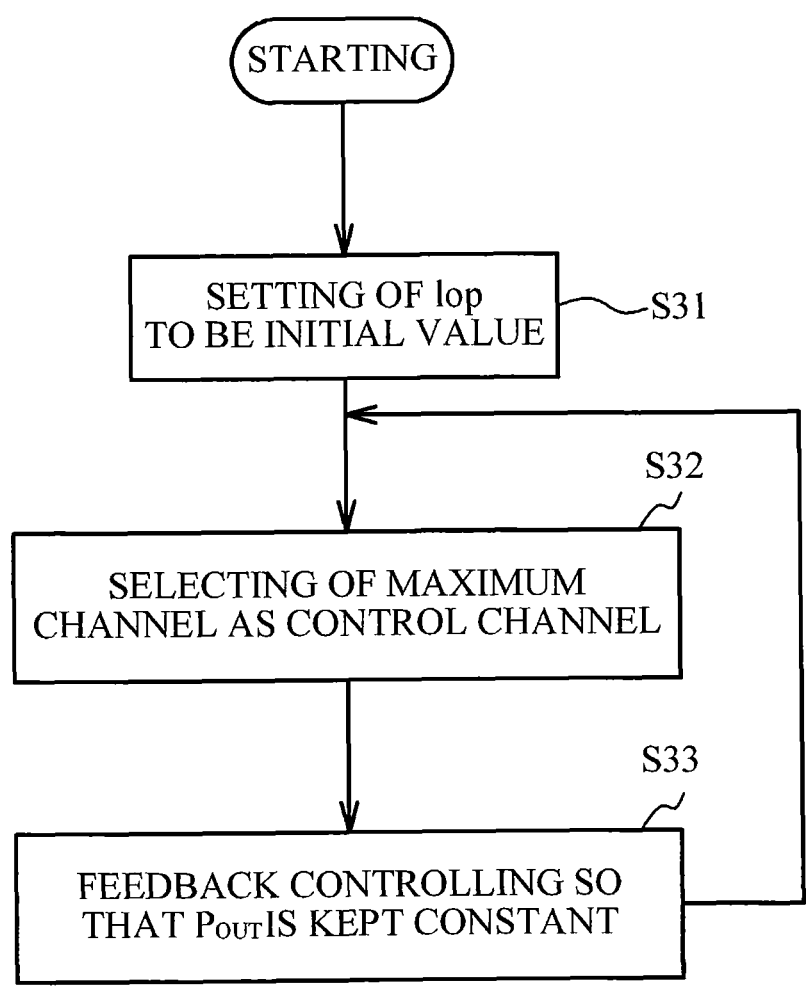
FIG. 13 illustrates an example of a flowchart.

FIG. 13 illustrates an example of flowchart of a control in accordance with the embodiment. As illustrated in FIG. 13, the operating-current control circuit 80 sets the operating current "Iop" of the semiconductor optical amplifier 30 to be the initial value (Step S31). Next, the operating-current control circuit 80 determines the channel of the maximum optical power, and selects the wavelength signal having the maximum optical power as the monitoring target (Step S32).

Next, the operating-current control circuit 80 feed-back controls the output power "Pout" of the semiconductor optical amplifier 30 constant (Step S33). The constant value of this case is set so that the optical power of the monitoring target is smaller one of a value equal to the predetermined value or more in the dynamic range of the light-receiving element 50 and the allowed value of the operating current (the allowed current amount). After that, the operating-current control circuit 80 executes Step S32 again after a given time period.

In accordance with the embodiment, the optical power of the wavelength signal having the maximum optical power is controlled to be the upper limit or less in the error free area. Therefore, the variation of the channels is included in the error free area. Accordingly, the operating current of the semiconductor optical amplifier 30 is controlled adequately, and a large dynamic range is secured with respect to a plurality of channels, even if there is an optical power difference between the channels. And, a circuit size is restrained because the optical coupler 10 and the light-receiving element 20 are not needed.

In the embodiment, the channel having the maximum optical power is selected as the monitoring target. However, the structure is not limited to the above embodiment. For example, the wavelength signal having the optical power more than the average optical power may be selected from the plurality of the wavelength signals fed into the optical receiver 100a as the monitoring target. However, it gets easier to include the variation of the channels in the error free area, by selecting the channel having the maximum optical power as the monitoring target. It is therefore preferable that the channel of the maximum optical power is selected as the monitoring target.

Third Embodiment

Figure 14:
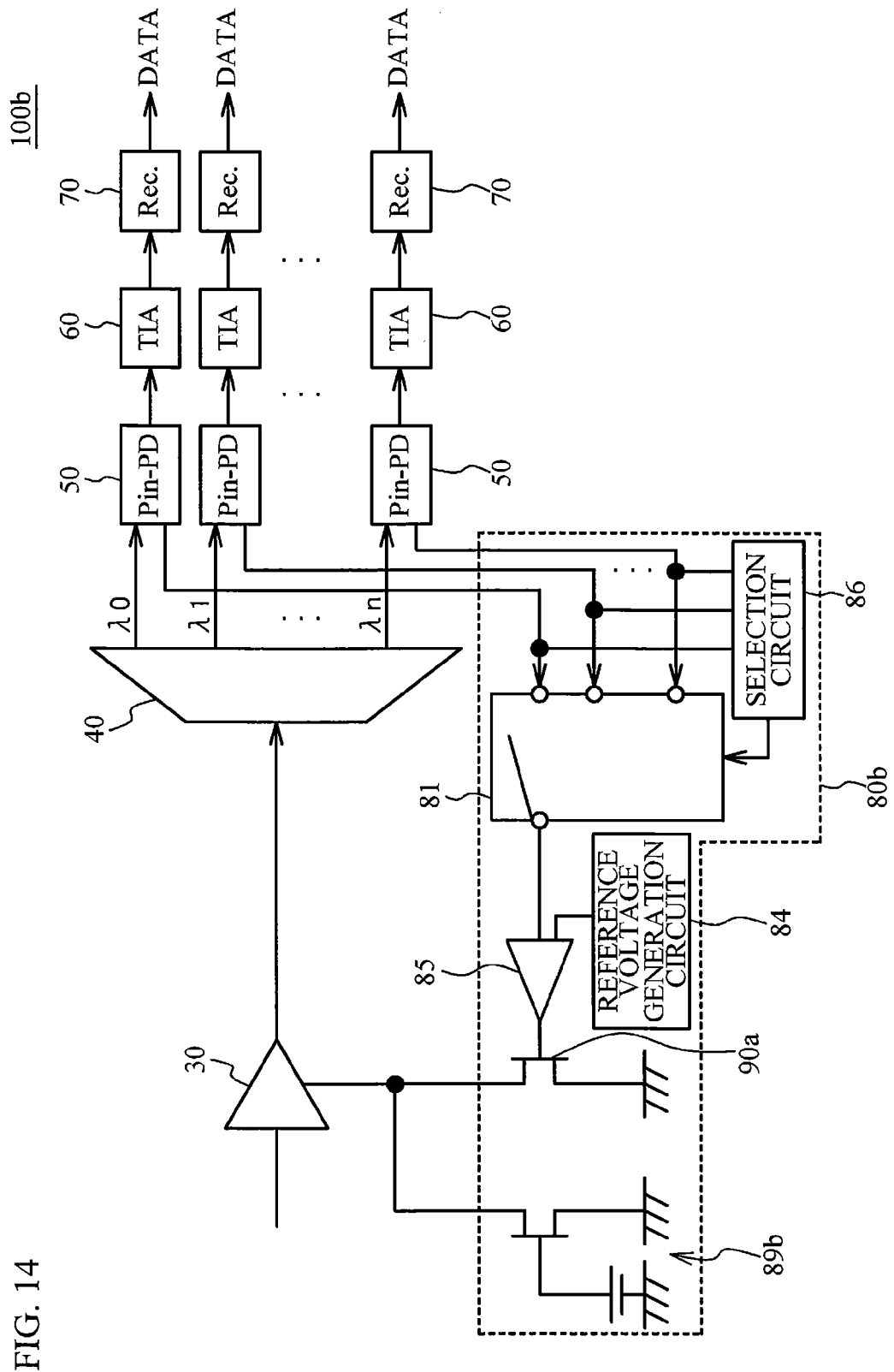
FIG. 14 illustrates a block diagram of an optical receiver in accordance with a third embodiment.

FIG. 14 illustrates a block diagram of an optical receiver 100b in accordance with a third embodiment. As illustrated in FIG. 14, the optical receiver 100b is different from the optical receiver 100a of FIG. 11 in points that the first switch 81 is provided instead of the second switch 82, and a constant-current-source circuit 89b is provided instead of the limit amplifier 89. The constant-current-source circuit 89b is a minimum limit function circuit for controlling a current so as not to be a predetermined value (a minimum limit) or less. The same components have the same reference numerals of FIG. 11 in order to avoid a duplicated explanation.

The channel selection circuit 86 controls the first switch 81 so that the detected wavelength signal having the minimum optical power is selected. Thus, the first switch 81 selects and outputs the wavelength signal having the minimum optical power. As a result, the wavelength signal having the minimum optical power becomes the monitoring target of the feed-back control. The reference voltage generation circuit 84 inputs the reference voltage set by the reference voltage switch circuit 88 into the amplifier 85. Thus, the optical power fed into the light-receiving element 50 selected by the first switch 81 is controlled to be a predetermined value based on the reference voltage. The reference voltage switch circuit 88 sets the feed-back control value so that the optical power fed into the light-receiving element 50 is larger one of a predetermined value or less in the dynamic range of the light-receiving element 50 and the allowed value of the operating current. The predetermined value in this case is a value of a case where the optical power of the wavelength signal having the maximum optical power is included in the error free area. The optical variation from the minimum optical power to the maximum optical power may be detected in advance. The allowed value of the operating current is an allowed current amount at the lower limit of the light-receiving sensitivity of the light-receiving element 50.

Figure 15A:
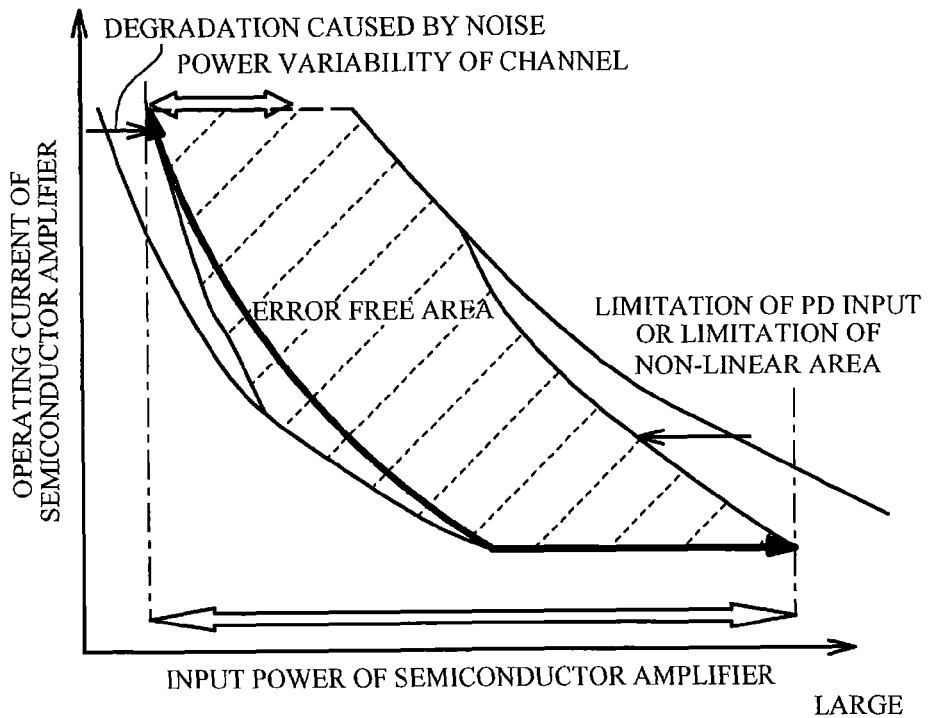
FIG. 15A and FIG. 15B illustrate a control in accordance with the third embodiment.
Figure 15B:
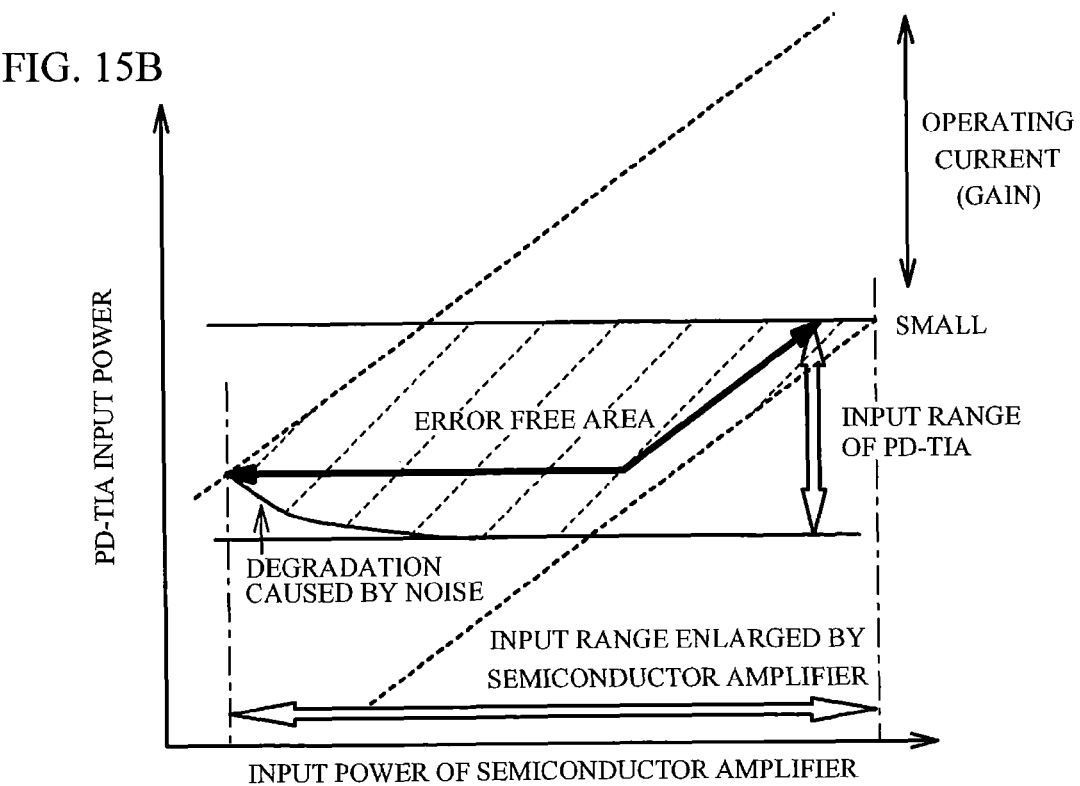

A current generated in the constant-current-source circuit 89b is set so that the optical power fed into the light-receiving element 50 is larger one of the predetermined value or less in the dynamic range of the light-receiving element 50 and the allowed value of the operating current. Thus, the optical power of the wavelength signal having the minimum optical power is controlled to be the lower limit or more of the error free area. In this case, as illustrated with a thick solid line having an arrow of FIG. 15A and FIG. 15b, the variation of the channels is included in the error free area.

Figure 16:
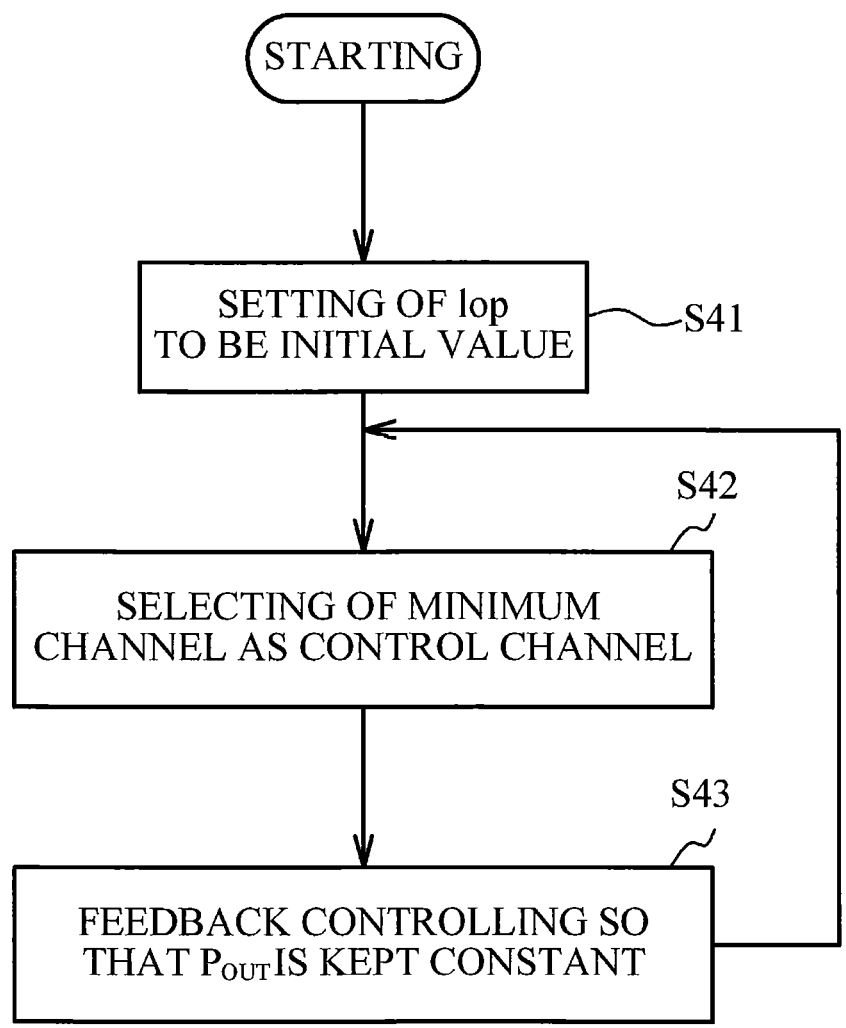
FIG. 16 illustrates an example of a flowchart.

FIG. 16 illustrates an example of a flowchart in accordance with the embodiment. As illustrated in FIG. 16, the operating-current control circuit 80 sets the operating current "Iop" of the semiconductor optical amplifier 30 to be the initial value (Step S41). Next, the operating-current control circuit 80 determines the channel having the minimum optical power and selects the wavelength signal having the minimum optical power as the monitoring target (Step S42).

Next, the operating-current control circuit 80 feed-back controls the output power "Pout" of the semiconductor optical amplifier 30 constant (Step S43). The constant value of this case is set so that the optical power of the monitoring target is larger one of the predetermined value or less in the dynamic range of the light-receiving element 50 and the allowed value of the operating current. After that, the operating-current control circuit 80 executes Step S42 after a given time period.

In accordance with the embodiment, the optical power of the wavelength signal having the minimum optical power is controlled to be the lower limit or more of the error free area. Therefore, the variation of the channels is included in the error free area. Accordingly, the operating current of the semiconductor optical amplifier 30 is adequately controlled and a large dynamic range is secured with respect to the plurality of the channels, even if there is an optical power difference between the channels. The circuit size is restrained because the optical coupler 10 and the light-receiving element 20 are not needed.

In the embodiment, the channel of the minimum optical power is selected as the monitoring target. However, the structure is not limited to the above embodiment. For example, the wavelength signal having the optical power smaller than the average optical power of the plurality of the wavelength signals fed into the optical receiver 100b may be selected as the monitoring target. However, it gets easier to include the variation of the channels in the error free area, by selecting the channel of the minimum optical power as the monitoring target. It is therefore preferable that the channel of the minimum optical power is selected as the monitoring target.

Fourth Embodiment

Figure 17:
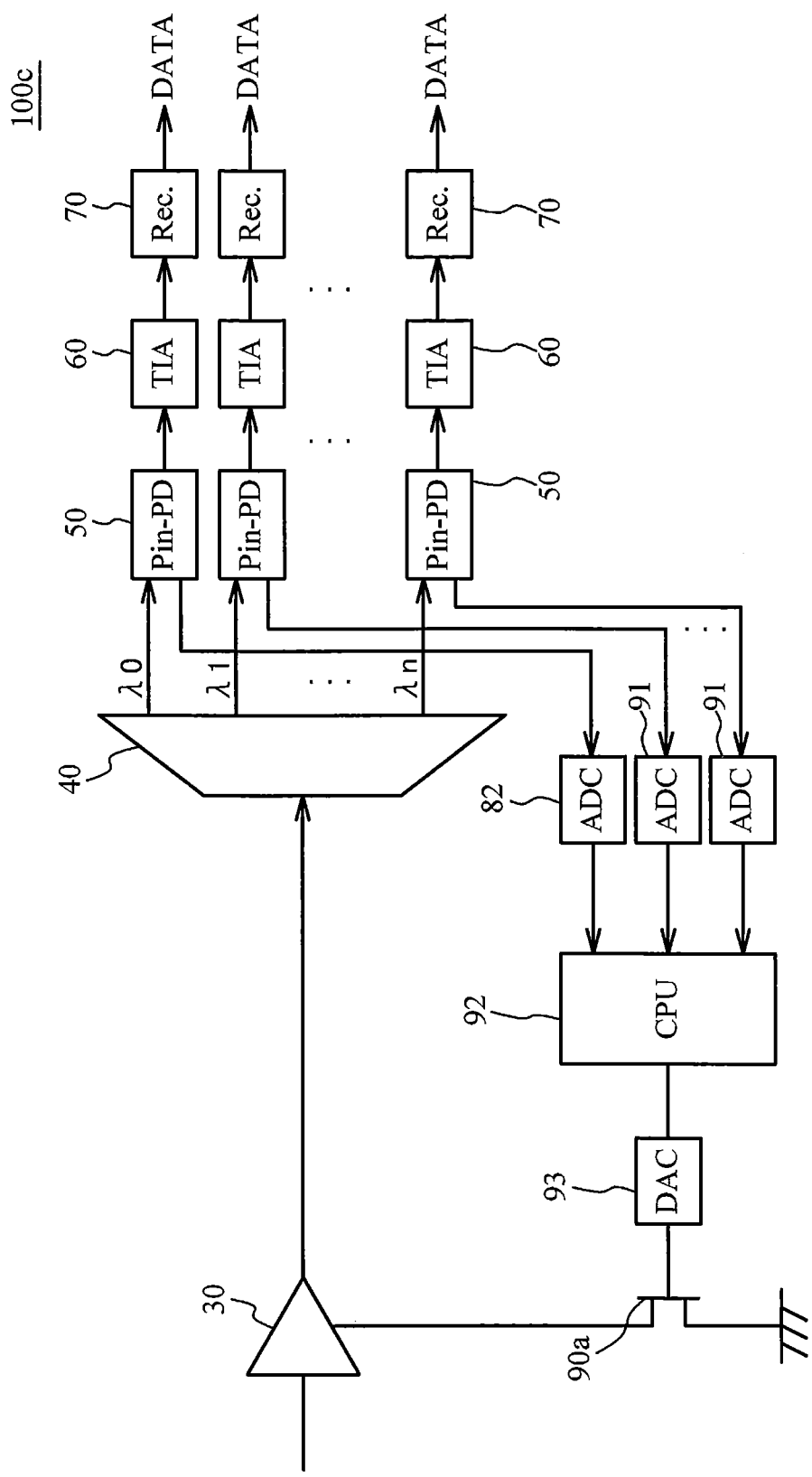
FIG. 17 illustrates a block diagram of an optical receiver in accordance with a fourth embodiment.

FIG. 17 illustrates a block diagram of an optical receiver 100c in accordance with a fourth embodiment. The optical receiver 100c has a variable-current-source circuit 90a, analog/digital converters (ADC) 91, a CPU 92, and a digital/analog convertor (DAC) 93. The number of the analog/digital converters 91 is the same as that of the channels. In the embodiment, the optical receiver 100c act as the optical receiver 100, the optical receiver 100a, or the optical receiver 100b in accordance with the first to third embodiments when the CPU 92 executes a given program. In concrete, the ADC 91, the CPU 92, and the DAC 93 act as the operating-current control circuits 80, 80a and 80b. The variable-current-source circuit 90a acts as the operating-current provide circuit 90 when the optical receiver 100c acts as the optical receiver 100 of the first embodiment. The CPU, the ADC and the DAC may act as the electronic circuit, the analog switch and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. An optical receiver comprising:
an optical amplifier that amplifies an optical signal fed thereinto according to an operating current fed thereinto, the optical signal being a wavelength-multiplexed optical signal,
a demultiplexer that demultiplexes an optical signal output from the optical amplifier;
an operating-current control circuit that selects a monitoring target from a plurality of wavelength signals output from the demultiplexer and controls the operating current of the optical amplifier so that optical power of the monitoring target is controlled to be a predetermined value;
an optical power detection portion that detects optical power of the optical signal fed into the optical amplifier; and
a light-receiving element that receives a plurality of wavelength signals output from the demultiplexer,
wherein the operating-current control circuit selects a wavelength signal having optical power larger than average optical power of the plurality of the wavelength signals from the plurality of the wavelength signals as the monitoring target and controls the operating current so that the optical power of the monitoring target is smaller one of a predetermined value in the dynamic range of the light-receiving element and an allowed value of the operating current when the optical power fed into the optical amplifier is larger than a first predetermined value, and selects a wavelength signal having optical power smaller than the average optical power from the plurality of the wavelength signals as the monitoring target and controls the operating current so that the optical power of the monitoring target is larger one of a predetermined value in the dynamic range of the light-receiving element and an allowed value of the operating current when the optical power fed into the optical amplifier is smaller than the first predetermined value.

2. The optical receiver as claimed in claim 1, wherein the operating-current control circuit selects a wavelength signal having maximum optical power from the plurality of the wavelength signals as the monitoring target if the optical power fed into the optical amplifier is larger than the first predetermined value, and selects a wavelength signal having minimum optical power from the plurality of the wavelength signals as the monitoring target if the optical power fed into the optical amplifier is smaller than the first predetermined value.

3. The optical receiver as claimed in claim 2, wherein the operating-current control circuit controls the operating current of the optical amplifier so that the optical power of the monitoring target is kept constant in a range that is equal to a limit of a non-linear area of the optical amplifier or less, if the wavelength signal having the maximum optical power is selected as the monitoring target.

4. The optical receiver as claimed in claim 1 wherein the operating-current control circuit sets the optical power of the monitoring target to be a second predetermined value or more in the dynamic range of the light-receiving element if the optical power fed into the optical amplifier is larger than the first predetermined value, and sets the optical power of the monitoring target to be a third predetermined value or less in the dynamic range of the light-receiving element if the optical power fed into the optical amplifier is smaller than the first predetermined value.

5. The optical receiver as claimed in claim 4 further comprising a light-receiving circuit that recognizes an optical signal fed thereinto according a detection result of the light-receiving element,
wherein the light-receiving circuit changes a recognition point if the optical power of the monitoring target is changed.

6. The optical receiver as claimed in claim 1, wherein the optical power detection portion detects optical power fed into the optical amplifier based on a detection value of a light-receiving element receiving the optical signal fed into the optical amplifier or an operating current of the optical amplifier and a detection value of a light-receiving element receiving a wavelength signal from the demultiplexer.

7. The optical receiver as claimed in claim 1 wherein the operating-current control circuit has an upper limit of the operating current with a maximum limit function circuit.

8. The optical receiver as claimed in claim 1, wherein the operating-current control circuit has a lower limit of the operating current with a minimum limit function circuit.

9. The optical receiver as claimed in claim 1, wherein the optical amplifier is a semiconductor optical amplifier.

10. A light-receiving method comprising:
amplifying an optical signal fed into an optical amplifier according to an operating current of the optical amplifier, the optical signal being a wavelength-multiplexed optical signal;
demultiplexing an output optical signal of the optical amplifier;
selecting a monitoring target from a plurality of wavelength signals branched in the demultiplexing; and
controlling the operating current of the optical amplifier so that optical power of the monitoring target is kept constant,
wherein:
a wavelength signal having optical power larger than average optical power of the plurality of the wavelength signals is selected from the plurality of the wavelength signals as the monitoring target and the operating current is controlled so that the optical power of the monitoring target is smaller one of a predetermined value in the dynamic range of the light-receiving element and an allowed value of the operating current when the optical power fed into the optical amplifier is larger than a first predetermined value; and
a wavelength signal having optical power smaller than the average optical power is selected from the plurality of the wavelength signals as the monitoring target and the operating current is controlled so that the optical power of the monitoring target is larger one of a predetermined value in the dynamic range of the light-receiving element and an allowed value of the operating current when the optical power fed into the optical amplifier is smaller than the first predetermined value.

* * * * *